(12) United States Patent
Jha et al.

(10) Patent No.: US 12,487,269 B2
(45) Date of Patent: Dec. 2, 2025

(54) SYSTEM AND METHOD FOR DETECTING BEARING INSULATION AND GROUND BRUSH HEALTH IN A GENERATOR

(71) Applicant: General Electric Renovables Espana, S.L., Barcelona (ES)

(72) Inventors: Kapil Jha, Bengaluru (IN); Rupam Mukherjee, Bengaluru (IN); Arvind Kumar Tiwari, Niskayuna, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 330 days.

(21) Appl. No.: 18/158,647

(22) Filed: Jan. 24, 2023

(65) Prior Publication Data
US 2024/0248128 A1    Jul. 25, 2024

(51) Int. Cl.
*G01R 31/12* (2020.01)
*F03D 7/02* (2006.01)
(Continued)

(52) U.S. Cl.
CPC ....... *G01R 31/1227* (2013.01); *F03D 7/0264* (2013.01); *F03D 17/032* (2023.08); *F03D 80/50* (2016.05); *G01R 21/00* (2013.01); *G01R 25/00* (2013.01); *H02P 9/007* (2013.01); *F05B 2260/80* (2013.01)

(58) Field of Classification Search
CPC .. G01R 31/1227; G01R 31/343; G01R 21/00; G01R 25/00; F03D 7/0264; F03D 80/50; F03D 80/70; F03D 80/703; F03D 17/021; F03D 17/0065; F03D 17/032; F03D 17/00; F03D 9/25; F05B 2260/80;
(Continued)

(56) References Cited

U.S. PATENT DOCUMENTS

2022/0321039 A1    10/2022   Mukherjee et al.
2022/0349385 A1 *  11/2022   Ali .......................... F03D 17/00

FOREIGN PATENT DOCUMENTS

EP         4071357 A1 *  10/2022   ............. F03D 17/00

OTHER PUBLICATIONS

Watson, Simon Jonathan et al. "Condition Monitoring of the Power Output of Wind Turbine Generators Using Wavelets", IEEE Transactions on Energy Conversion, vol. 25, No. 3, Sep. 1, 2010, pp. 715-721.*

(Continued)

*Primary Examiner* — Manuel L Barbee
(74) *Attorney, Agent, or Firm* — Dority & Manning, P.A.

(57) ABSTRACT

A method for preventing damage in a bearing of a generator of an electrical power system having a power conversion assembly with a first converter coupled to a second converter, and the power conversion assembly electrically coupled to the generator. Further, the method includes monitoring a phase current and voltage of the first converter. The method also includes calculating a common mode power using the phase current and the voltage of the first converter. Moreover, the method includes comparing the common mode power to a predefined power threshold. The method also includes determining whether the common mode power is indicative of degradation in at least one of a bearing insulation or a ground brush based on the comparison of the common mode power to the predefined power threshold.

17 Claims, 7 Drawing Sheets

(51) Int. Cl.
  *F03D 9/25* (2016.01)
  *F03D 17/00* (2016.01)
  *F03D 80/50* (2016.01)
  *F03D 80/70* (2016.01)
  *G01R 21/00* (2006.01)
  *G01R 25/00* (2006.01)
  *G01R 31/34* (2020.01)
  *H02J 3/38* (2006.01)
  *H02P 9/00* (2006.01)
  *H02P 29/024* (2016.01)

(58) Field of Classification Search
  CPC ....... H02J 2300/28; H02J 3/381; H02P 9/006; H02P 9/007; H02P 29/024
  See application file for complete search history.

(56) References Cited

OTHER PUBLICATIONS

EPO Search Report, Jun. 10, 2024.

Simon Jonathan Watson: Condition Monitoring of the Power Output of Wind Turbine Generators Using Wavelets; IEEE Transactions On Energy Conversion, vol. 25, No. 3, Sep. 1, 2010, pp. 715-721, ieeexplore.ieee.org/stampPDF/getPDF.jsp?tp=&arnumber=5422657&ref=aHR0cHM6Ly9zY2hvbGFyLmdvb2dsZS5jb20v.

W. Yang: Condition monitoring and fault diagnosis of a wind turbine synchronous generator drive train; IET Renewable Power Generation, Jan. 1, 2009 The Institution of Engineering and Technology; vol. 3, No. 1, Jan. 1, 2009, p. 1, www.researchgate.net/profile/Wenxian-Yang/publication/224355024_Condition)monitoring_and_fault_diagnosis_of_a_wind_turbine_synchronous_generator_drive_train/links/01e7e529643f909ee1000000/Condition-monitoring-and-fault-diagnosis-of-a-wind-turbine-synchronous-generator-drive-train.pdf.

P.J. Tavner: Review of condition monitoring of rotating electrical machines; IET Electric Power Applications, vol. 2, No. 4, Jan. 1, 2008, p. 215, www.researchgate.net/profile/Pi-Tavner/publication/3478386_Review_of_condition_monitoring_of_rotating_electrical_machines_Electric_Power_Applications_IET-24_215-247/links/5a4a3b5ba6fdcce1971f6b1d/Review-of-condition-monitoring-of-rotating-electrical-machines-Electric-Power-Applications-IET-24-215-247.pdf.

* cited by examiner

SYSTEM AND METHOD FOR DETECTING BEARING INSULATION AND GROUND BRUSH HEALTH IN A GENERATOR

FIELD

The present disclosure relates generally to wind turbines and, more particularly, to a system and method for detecting bearing insulation and ground brush health in a doubly-fed induction generator of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the rotor blades transform wind energy into a mechanical rotational torque that drives a low-speed shaft. The low-speed shaft is configured to drive the gearbox that subsequently steps up the low rotational speed of the low-speed shaft to drive a high-speed shaft at an increased rotational speed. The high-speed shaft is generally coupled to the generator so as to rotatably drive a generator rotor. As such, a rotating magnetic field may be induced by the generator rotor and a voltage may be induced within a generator stator. Rotational energy is converted into electrical energy through electromagnetic fields coupling the rotor and the stator, which is supplied to a power grid via a grid breaker. Thus, the main transformer steps up the voltage amplitude of the electrical power such that the transformed electrical power may be further transmitted to the power grid.

In some wind turbines, the generator may be electrically coupled to a bi-directional power converter that includes a rotor-side converter joined to a line-side converter via a regulated DC link. Such wind turbine power systems are generally referred to as a doubly-fed induction generator (DFIG). DFIG operation is typically characterized in that the rotor circuit is supplied with current from a current-regulated power converter. As such, the wind turbine produces variable mechanical torque due to variable wind speeds and the power converter ensures this torque is converted into an electrical output at the same frequency of the power grid.

Capacitive coupling between the generator rotor and the generator stator, though not the main contributor to the generated power, can induce an undesirable rotor shaft voltage in the generator rotor. In addition, high common-mode voltage injected through the rotor-side converter can potentially damage one or more bearings of the electrical power system through Electric Discharge Machining (EDM). Under normal operating conditions, the current driven by the rotor shaft voltage is safely dissipated through a ground brush that is in contact with the generator rotor and ground. Also, bearing insulation is provided between the bearing housing and a frame of the DFIG.

However, wear and tear impacts the conductivity of the ground brush as well as the insulating capability of the bearing insulation. As a result, if the ground brush loses contact with the generator rotor, voltage can build up on the rotor shaft. As the voltage builds up, it can discharge to ground using the lowest impedance path. For DFIGs, this path can correspond to the oil in the bearing housing. As such, the voltage can discharge in a pulse, thereby causing an arc. This cycle can be repeated as long as the ground brush is lifted, causing pitting and fluting of the bearing track which ultimately leads to bearing failure. Accordingly, degradations in the bearing insulation and/or the ground brush need to be detected at an incipient stage to prevent EDM-induced bearing damage at a later stage.

Thus, the present disclosure is directed to a system and method for detecting degradation in the bearing insulation and/or the ground brush at an early stage so as to address the aforementioned issues.

BRIEF DESCRIPTION

Aspects and advantages of the present disclosure will be set forth in part in the following description, or may be obvious from the description, or may be learned through practice of the present disclosure.

In one aspect, the present disclosure is directed to a method for preventing damage in a bearing of a generator of an electrical power system having a power conversion assembly with a first converter coupled to a second converter, and the power conversion assembly electrically coupled to the generator. Embodiments of the method include monitoring a phase current and a phase voltage of the first converter. Embodiments of the method also include calculating a common mode power using the phase current and the phase voltage of the first converter. Embodiments of the method also include comparing the common mode power to a predefined power threshold. Embodiments of the method also include determining whether the common mode power is indicative of degradation in at least one of a bearing insulation or a ground brush of the bearing based on the comparison of the common mode power to the predefined power threshold.

In still another aspect, the present disclosure is directed to a wind turbine power system connected to a power grid. Embodiments of the system include a doubly-fed induction generator (DFIG) comprising a rotor and a stator. Embodiments of the system also include a power conversion assembly electrically coupled to the DFIG, the power conversion assembly comprising a rotor-side converter coupled to a line-side converter. Embodiments of the system also include a controller configured to control the wind turbine power system, the controller configured to perform a plurality of operations, the plurality of operations comprising: monitoring a rotor phase current and rotor-side voltage of the rotor-side converter; calculating a common mode power using the rotor phase current and the rotor-side voltage; comparing the common mode power to a predefined power threshold; and determining whether the common mode power is indicative of degradation in at least one of a bearing insulation or a ground brush of the DFIG based on the comparison of the common mode power to the predefined power threshold.

In still another aspect, the present disclosure is directed to a wind turbine power system connected to a power grid. Embodiments of the system include a doubly-fed induction generator (DFIG) comprising a rotor and a stator. Embodiments of the system also include a power conversion assembly electrically coupled to the DFIG, the power conversion assembly comprising a rotor-side converter coupled to a line-side converter. Embodiments of the system include a controller configured to control the wind turbine power system, the controller configured to perform a plurality of operations, the plurality of operations comprising: monitoring a phase current and phase voltage of the line-side converter; calculating a common mode power using the phase current and the phase voltage; comparing the common mode power to a predefined power threshold; and determining whether the common mode power is indicative of degradation in at least one of a bearing insulation or a ground brush of the DFIG based on the comparison of the common mode power to the predefined power threshold.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to a system and method for preventing damage in a bearing (e.g., damage to the bearing insulation or ground brush) of a generator (such as a DFIG) of an electrical power system (such as a wind turbine power system) connected to a power grid. In particular, in an embodiment, the three-phase current and the three-phase voltage of a converter of an electrical power system may be analyzed to calculate a common mode power of a power network and to determine the common mode power being dissipated by the converter. Thus, in an embodiment, the three-phase current and voltage may be stored and analyzed by a controller to detect degradation in the ground brush of the generator at an early stage.

In particular, in an embodiment according to the present disclosure, the controller may be a wind turbine controller that is part of a wind turbine power system connected to a power grid. The wind turbine may include a DFIG and a power conversation assembly having a rotor-side converter coupled to a line-side converter via a DC link. In an operating mode, the wind turbine controller may monitor a rotor phase current and a voltage of the rotor-side converter. The wind turbine controller may thus calculate a common mode power using the rotor phase current and the voltage of the rotor-side converter. The wind turbine controller may also compare the common mode power to a predefined power threshold and determine whether the common mode power is indicative of degradation in bearing insulation and/or a ground brush of the DFIG based on the comparison of the common mode power to the predefined power threshold.

As such, the present disclosure provides many advantages not present in the prior art. For example, systems and methods of the present disclosure can achieve brush diagnostics without the need for separate sensors for measuring shaft voltage and/or leakage path current. Rather, as mentioned, systems and methods of the present disclosure can use converter electrical signals for ground-brush diagnostics. In particular, in an embodiment, systems and methods of the present disclosure estimate ground-brush health through frequency spectrum analysis of the rotor-side common mode network. For example, in an embodiment, systems and methods of the present disclosure can detect bearing housing insulation degradation through common mode power analysis.

Figure 1:
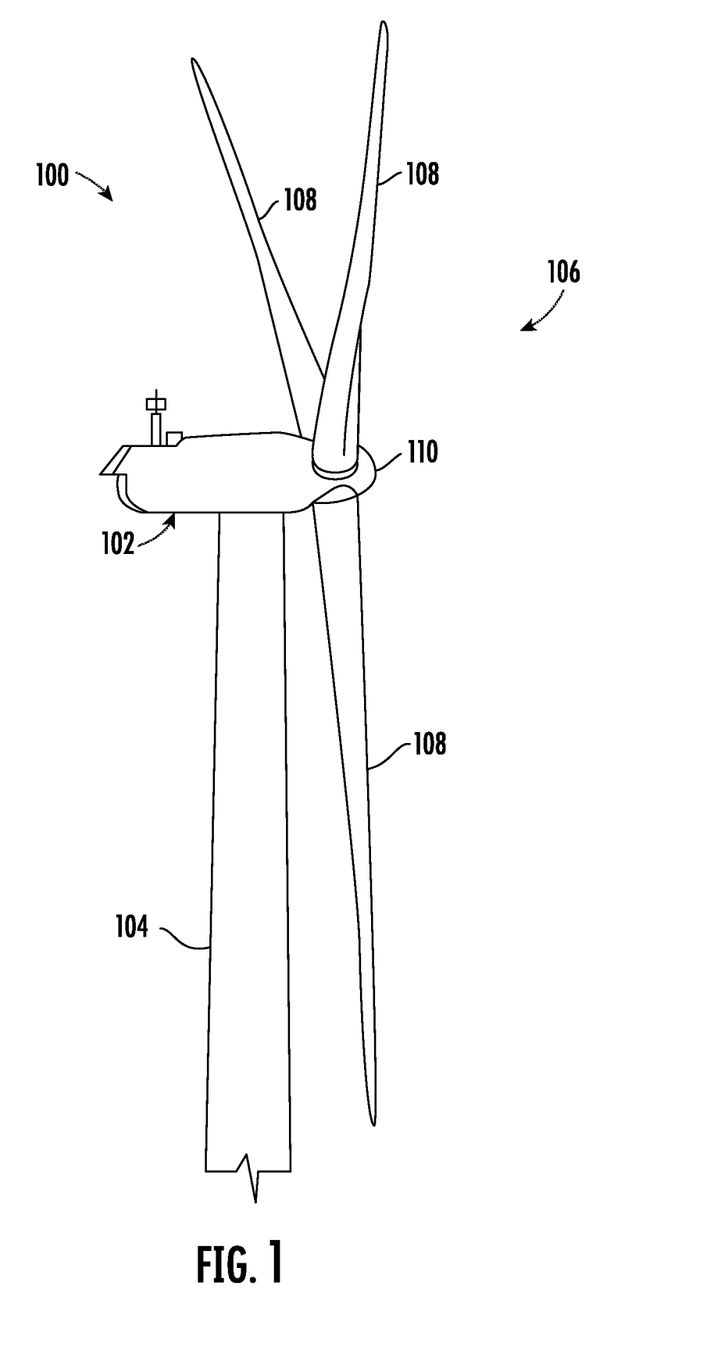
FIG. 1 illustrates a perspective view of a portion of one embodiment of a wind turbine according to the present disclosure.

Referring now to the drawings, FIG. 1 illustrates a perspective view of a portion of a wind turbine 100 according to the present disclosure that is configured to implement the method as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein. Using the teachings disclosed herein, a person having ordinary skill in the art understands that the present disclosure can be applied to systems different from wind turbine generators, for example, any machine or electrical system connected to a drive. Consequently, the description set forth herein is for illustrative purposes only and is not intended to limit the disclosure in any aspect.

Figure 2:
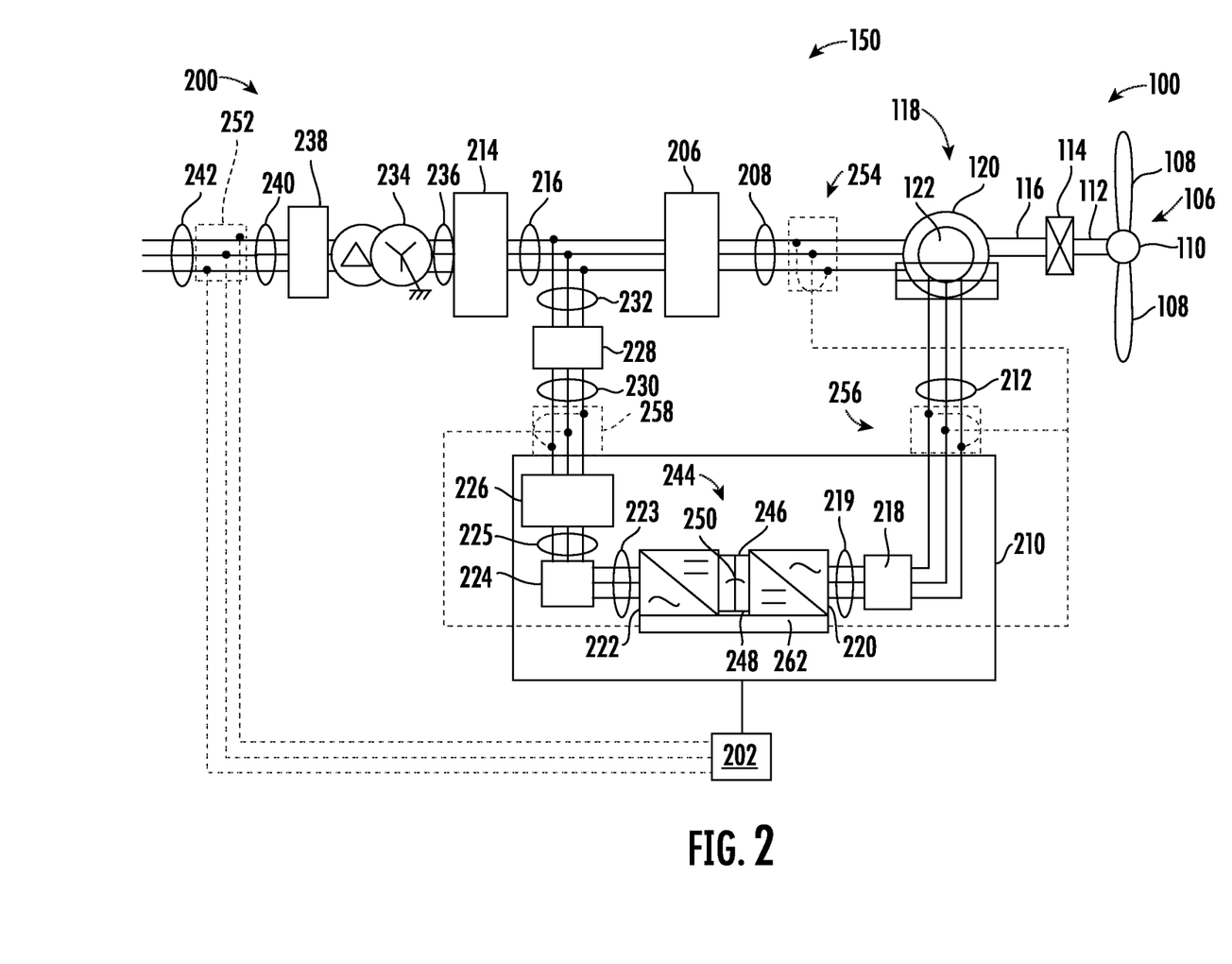
FIG. 2 illustrates a schematic view of one embodiment of an electrical power system suitable for use with the wind turbine shown in FIG. 1.
Figure 5:
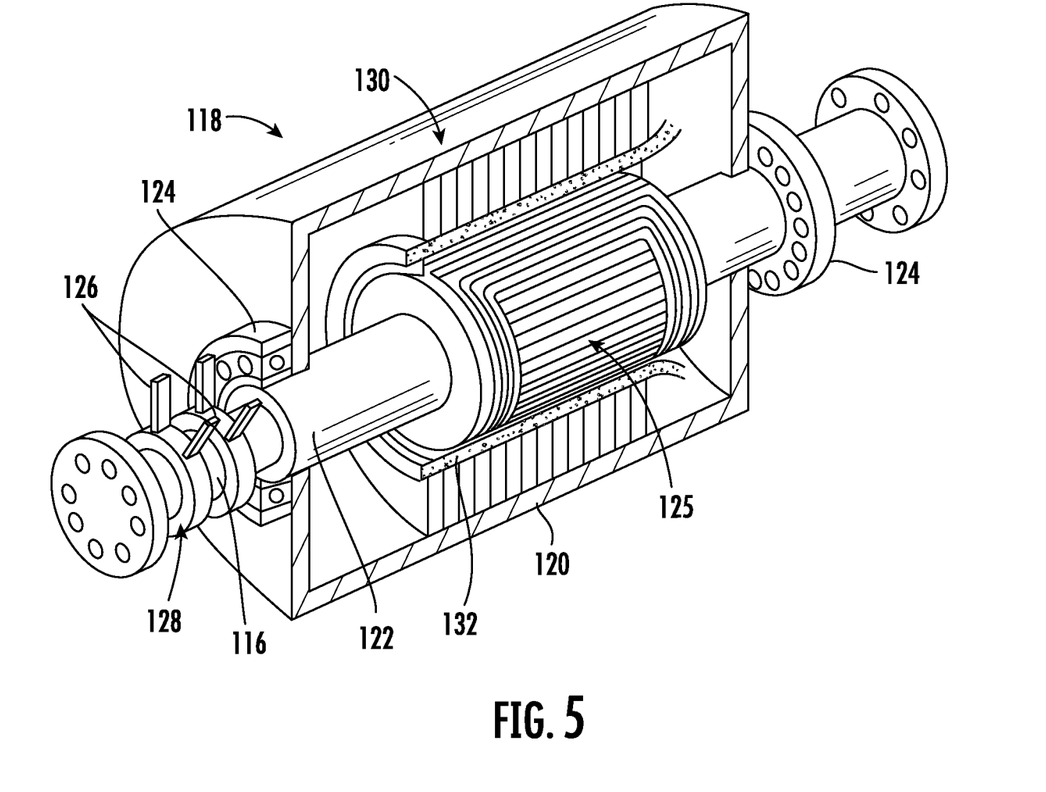
FIG. 5 illustrates a cross-sectional schematic view of one embodiment of a generator according to the present disclosure, particularly illustrating a ground brush contacting the rotor of the generator.

Referring now to FIG. 2, a schematic view of one embodiment of an electrical power system 200 that may be used with the wind turbine 100 is illustrated. Furthermore, the wind turbine 10 and the electrical power system 200 may be referred to herein collectively as a wind turbine power system 150. Thus, during operation of the wind turbine power system 150, wind impacts the blades 108 and the blades 108 transform wind energy into a mechanical rotational torque that rotatably drives a low-speed shaft 112 (also referred to herein as a rotor shaft) via the hub 110. The low-speed shaft 112 is configured to drive a gearbox 114 that subsequently steps up the low rotational speed of the low-speed shaft 112 to drive a high-speed shaft 116 (also referred to herein as a generator shaft) at an increased rotational speed. The high-speed shaft 116 is generally rotatably coupled to a generator 118 so as to rotatably drive a generator rotor 122 having field winding 125 (FIG. 5).

In one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

Figure 3:
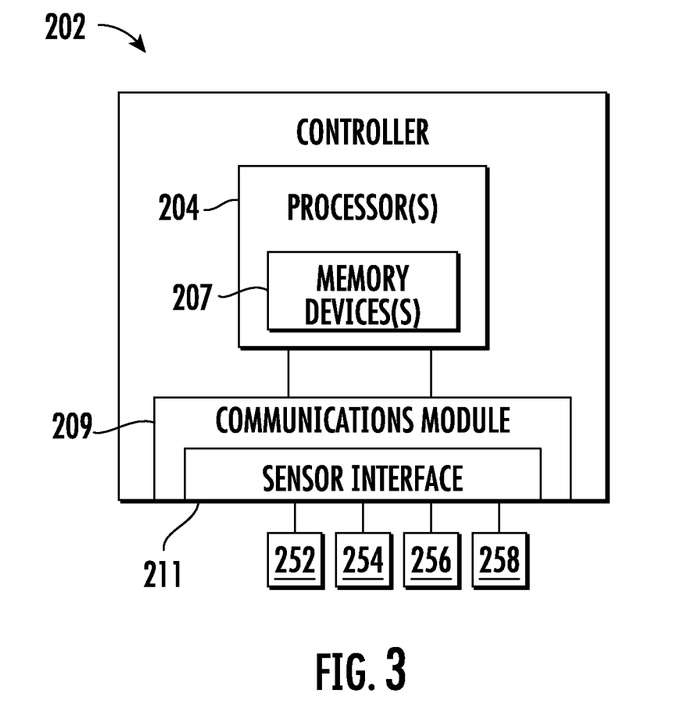
FIG. 3 illustrates a block diagram of one embodiment of a controller suitable for use with the wind turbine shown in FIG. 1.

In addition, the electrical power system 200 may include a controller 202 configured to control any of the components of the wind turbine 100 and/or implement the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, the generator rotor 122 may be electrically coupled to a bi-directional power conversion assembly 210 or power converter via a rotor bus 212. Alternatively, the generator rotor 122 may be electrically coupled to the rotor bus 212 via any other device that facilitates operation of electrical power system 200 as described herein. In a further embodiment, the stator synchronizing switch 206 may be electrically coupled to a main transformer circuit breaker 214 via a system bus 216.

The power conversion assembly 210 may include a first converter and a second converter. For example, as shown, the first converter may be a rotor-side converter 220 and the second converter may be a line-side converter 222. Further, as shown, the power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to the rotor-side converter 220. Further, the rotor-side converter 220 may be electrically coupled to the line-side converter 222 via a single direct current (DC) link 244. Alternatively, the rotor-side converter 220 and the line-side converter 222 may be electrically coupled via individual and separate DC links. In addition, as shown, the DC link 244 may include a positive rail 246, a negative rail 248, and at least one capacitor 250 coupled therebetween.

In addition, a line-side converter bus 223 may electrically couple the line-side converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

Figure 4:
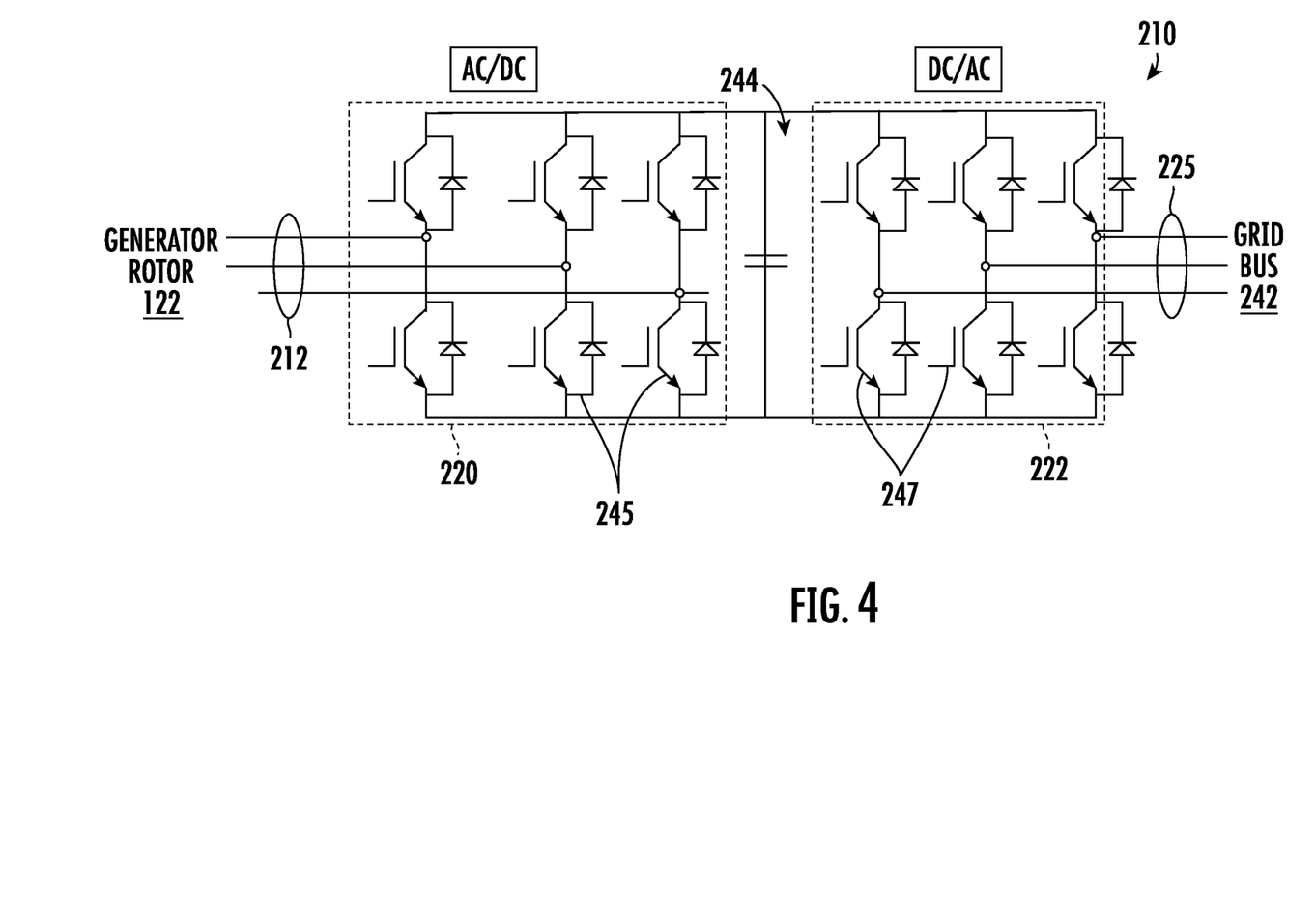
FIG. 4 illustrates a simplified schematic diagram of one embodiment of a variable frequency drive (VFD) that maintains a constant electrical frequency output on the grid side of the generator according to the present disclosure.

Referring particularly to FIGS. 2 and 4, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side converter 220 converts the AC power provided from the rotor bus 212 into DC power and provides the DC power to the DC link 244. Switching elements 245 are insulated gate bipolar transistors (e.g. IGBTs) used in bridge circuits of the rotor side power converter 220 that can be modulated to convert the AC power provided from the rotor bus 212 into DC power suitable for the DC link 244.

The line-side converter 222 converts the DC power on the DC link 244 into AC output power suitable for the electrical grid bus 242. In particular, switching elements 247 (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz).

It should be understood that the rotor-side converter 220 and the line-side converter 222 may have any configuration using any switching devices that facilitate operation of electrical power system 200 as described herein. For example, FIG. 4 illustrates a simplified schematic diagram of one embodiment of a variable frequency drive (VFD) that maintains a constant electrical frequency output on the grid side of the generator 118. As shown, the VFD configuration includes a six-switch voltage-sourced rectifier on the rotor-side converter 220, the DC link 244 to minimize DC voltage variation, and a six-switch voltage-sourced inverter utilizing pulse width modulation on the grid side. Rotor-side switching elements 245, in certain embodiments, are diodes or silicon controlled rectifiers (SCR) (not shown), while the grid side-switching elements 247 are IGBTs. Regardless of the configuration of the switching element 245, the magnitude and electrical frequency of the current supplied to the generator rotor 122 through the VFD may be varied to account for changes in the rotor shaft speed and to maintain a constant output on the generator stator winding.

Further, the power conversion assembly 210 may be coupled in electronic data communication with the controller 202 and/or a separate or integral converter controller 262 to control the operation of the rotor-side converter 220 and/or the line-side converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical power system 200 that facilitates operation of electrical power system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors 252, 254, 256, 258 may be employed within the wind turbine 100 and at any location. For example, the sensors may be current transformers, shunt sensors, Rogowski coils, Hall Effect current sensors, Micro Inertial Measurement Units (MIMUs), or similar, and/or any other suitable voltage or electric current sensors now known or later developed in the art.

Thus, the controller 202 (or converter controller 262) is configured to receive one or more voltage and/or electric current feedback signals from the sensors 252, 254, 256, 258. More specifically, in certain embodiments, the current or voltage feedback signals may include line feedback signals, line-side converter feedback signals, rotor-side converter feedback signals, stator feedback signals, or combinations thereof, or any other suitable signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the controller 202. As such, the converter controller 262 is configured to implement the various method steps as described herein and may be configured similar to the controller 202.

Figure 6:
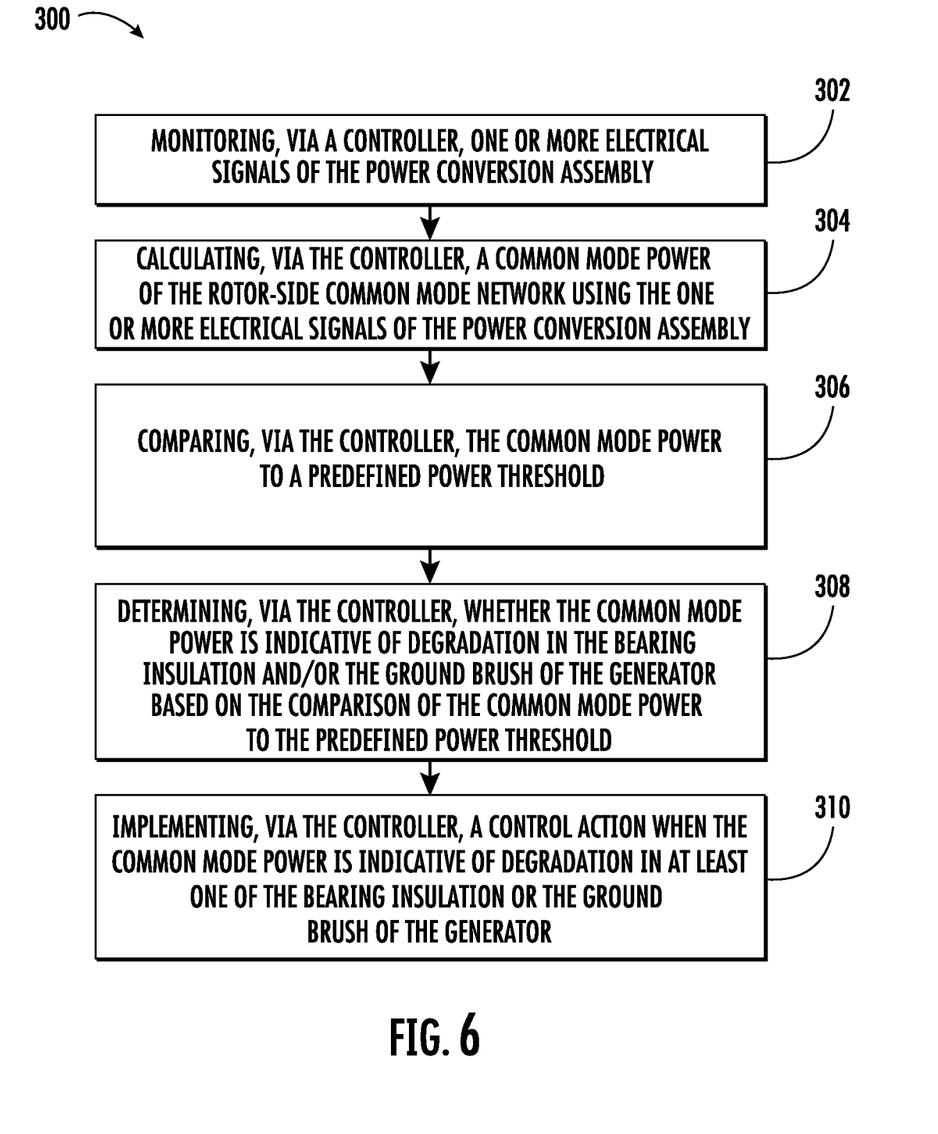
FIG. 6 illustrates a flow diagram of one embodiment of a method for preventing damage in a bearing of a generator of an electrical power system according to the present disclosure.

Referring now to FIGS. 5 and 6, various illustrations are provided to further describe the systems and methods of the present disclosure. For example, FIG. 5 illustrates a perspective cross-sectional view of one embodiment of the generator 118 of the present disclosure, particularly illustrating a plurality of brushes 126 configured with the rotor 122 thereof; and FIG. 6 illustrates a flow diagram of one embodiment of a method 300 for preventing damage in a bearing, such as bearings 124, of the generator 118 of an electrical power system 200.

As shown particularly in FIG. 5, the generator 118 may generally include a bearing housing 130 for housing the generator stator 120 and the generator rotor 122. Further, as shown, the generator rotor 122 includes the field winding 125 or coil. Moreover, as shown, the bearing housing 130 also generally includes bearing insulation 132 circumferentially arranged around the field winding 125. In addition, the generator 118 may further include one or more bearings 124 rotatably mounted onto the high-speed shaft 116. The bearings 124 may include an inner and an outer race and ball bearings therebetween. Furthermore, the generator 118 may include one or more generator slip rings 128 with one or more of the brushes 126 secured thereto.

Accordingly, during operation, voltage is typically induced on the high-speed shaft 116 due to capacitive coupling between the generator rotor 122 and the generator stator 120. The capacitive coupling is directly related to the VFD operation because a change in voltage over time (dv/dt) results in capacitive coupling. In addition, non-symmetry of the generator magnetic field may also cause shaft voltage on the high-speed shaft 116. Under normal operating conditions, the current driven by this induced shaft voltage is safely dissipated through the brushes 126. In general, such brushes 126 act as sliding contacts between the rotating slip ring and the stationary bus bars.

In certain embodiments, the brushes 126 are constructed from a graphite/metal composite that is pressed into rectangular bar shapes and are typically mounted on the non-drive end of the generator 118. It should be understood that the generator 118 may include any suitable number of brushes 126, including particularly at least one brush, and the corresponding structure for holding the brush(es) 126. Moreover, as shown in FIG. 5, the brushes 126 may be mounted generally perpendicular to the high-speed shaft 116. Alternatively, the brushes 126 may have any other suitable mounting configuration or structure with respect to the generator rotor 122. As such, some of the brushes 126 may be used to extract AC voltage off of at least one of the generator slip rings 128, while the remaining brush(es) 126 may act as a controlled path to ground (i.e. a ground brush). Further, as shown, the brushes 126 may be positioned radially outward of the generator slip ring(s) 128, with consecutive brushes 126 in each set mounted 60 to 120 degrees apart. In addition, each brush 126 may be rigidly fixed in its axial position so as to minimize deflection under normal operational load. The brush holders may also use a constant pressure coil spring to maintain contact between the brush(es) 126 and the generator slip ring(s) 128. A micro switch may also be mounted at the base of the brush holder so as to trigger a warning signal if the brush 126 has worn down too much.

As such, the brush 126 may be sized and oriented to engage the generator rotor 122 to facilitate providing an electrical connection from the generator rotor 122 to ground (not shown). Thus, the ground brush 126 is configured to protect the bearings 124 as well as all other components of the generator 118 from harmful electrical voltages and currents. More specifically, the ground brush 126 is configured to provide a low-impedance path around the bearings 124.

When a generator grounding system is compromised (e.g., when the ground brush 126 loses contact with the corresponding generator slip ring 128), an excess voltage builds up on the high-speed shaft 116. This shaft voltage drives a current to locate the lowest impedance path to ground. In the case of a wind turbine DFIG, this path is through the bearing housing 130 and through the ground brush 126 holding structure (for example, the constant pressure coil spring structure maintaining contact between the brush(es) 126 and the generator slip ring(s) 128 as described herein). More specifically, the high-speed shaft 116 generally accumulates voltage first. If the grounding system is compromised (e.g., the ground brush 126 is lifted or the ground path is disrupted), all components connected or coupled to the generator rotor 122 can also begin to accumulate voltage. The outer race ball pass of the bearings 124 is where the majority of the discharge occurs due to the presence of lubricating oil. Once this voltage exceeds the dielectric capacity of the lubricating oil in the bearing, the excess voltage can discharge in a pulse, causing an arc. Concurrently, voltage can begin to build up in the ground brush holding structure at the non-drive end of the generator 118 and ultimately result in a pulse causing the electric discharge arc. This cycle tends to repeat as long as the ground brush 126/ground path is compromised, causing pitting and fluting of the bearing track, ultimately leading to bearing failure. In addition, the aforementioned issues also cause damage to the bearing insulation 132.

As such, the present disclosure is directed to preventing such bearing damage. More specifically, as shown in FIG. 6, a flow diagram of one embodiment of the method 300 for preventing damage in a bearing, such as one of bearings 124, of the generator 118 of an electrical power system 200 is shown. In general, the method 300 is described herein with reference to the wind turbine 10, the electrical power system 200, the controller 202, and the generator 118 illustrated in FIGS. 1-5. However, it should be appreciated that the disclosed method 300 may be implemented with electrical power systems having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes monitoring, via a controller (such as controller 202), one or more electrical signals of the power conversion assembly 210. For example, in an embodiment, the operating parameter(s) may include current and/or voltage collected from the rotor-side converter 220. More specifically, in an embodiment, the current may be a phase current of the rotor-side converter 220 and the voltage may be a rotor voltage.

As shown at (304), the method 300 includes calculating, via the controller 202, a common mode power of the rotor-side common mode network using the one or more electrical signals of the power conversion assembly 210. In an embodiment, for example, the electrical signals may be a rotor phase current or a voltage of the rotor-side converter. More specifically, FIG. 7 illustrates a detail method 400 that, as shown at (402), includes capturing the rotor phase voltage ($V_{R\_a[b,c]}$) and rotor currents ($I_{R\_a[b,c]}$) to estimate the impedance path, and calculating a common mode voltage ($V_{R\_CM}$) the rotor-side voltage.

Figure 7:
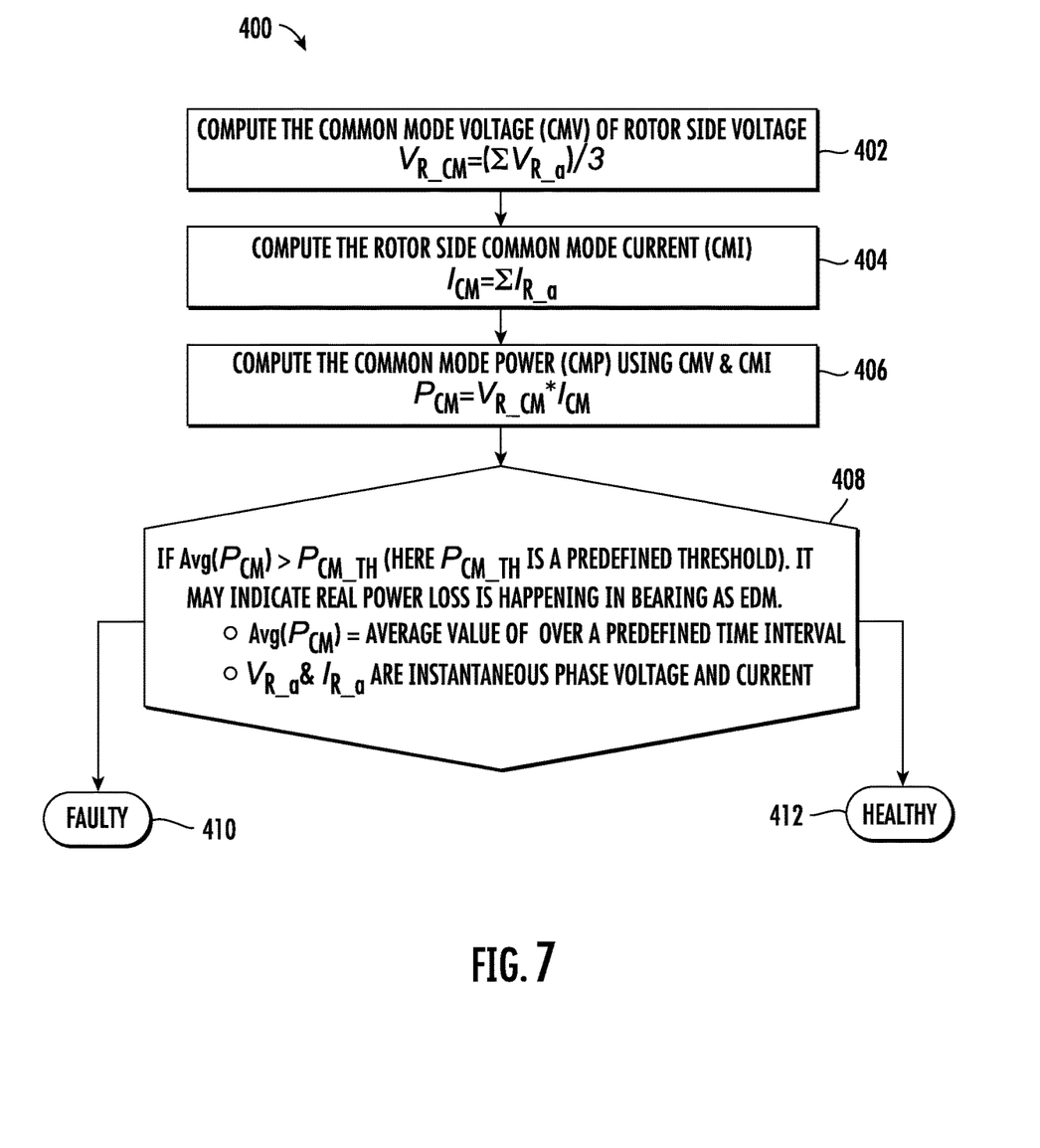
FIG. 7 illustrates a flow diagram of another embodiment of a method for preventing damage in a bearing of a generator of an electrical power system according to the present disclosure.

Moreover, as shown at (404) of FIG. 7, the method 400 also includes calculating a common mode current ($I_{R\_CM}$) using the rotor phase current of the rotor-side converter 220. For example, as shown, the common mode voltage ($V_{R\_CM}$) and the common mode current ($I_{R\_CM}$) injected by the rotor-side converter 220 may be calculated using Equations (1) and (2), respectively, below:

$$V_{R\_CM} = (V_A + V_B + V_C)/3 \qquad \text{Equation (1)}$$

$$I_{R\_CM} = I_A + I_B + I_C \qquad \text{Equation (2)}$$

where $V_A$, $V_B$, and $V_C$ are the three-phase PWM voltages from the rotor-side converter 220, and where $I_A$, $I_B$, and $I_C$ are the three-phase PWM currents from the rotor-side converter 220.

In certain embodiments, in-situ measurement of terminal voltages can be avoided or supplemented by pre-programming. Further, common mode voltage of specific frequencies of interest can be characterized as a function of modulation states and internal voltages of the line-side and rotor-side converters 220, 222. The common mode current may also be measured directly through a current sensor on the grounding path and/or on the return line.

Moreover, as shown at (406) of FIG. 7, the controller 202 can then calculate the common mode power ($P_{R\_CM}$) using the common mode voltage ($V_{R\_CM}$) and a common mode current ($I_{R\_CM}$). For example, as shown, the common mode power may be calculated using Equations (1) and (2), respectively, below:

$$P_{R\_CM} = (V_{R\_CM} * I_{R\_CM}) \qquad \text{Equation (3)}$$

In additional embodiments, the method 300 may also include using one or more data-based approaches, after calculating the common mode power, to flag indications that the common mode power is being dissipated. In such embodiments, the method 300 may also include trending these indications over time. For example, in an embodiment, determining whether the common mode power is indicative of degradation in the bearing insulation and/or the ground brush of the bearing may further include producing a time-domain graph of the common mode power for a predefined time period. Moreover, determining whether the common mode power is indicative of degradation may also include producing one or more time-domain features from the time-domain graph. Further, determining whether the common mode power is indicative of degradation also includes analyzing the one or more time-domain features for anomalies in the time-domain graph.

Similarly, in another embodiment, determining whether the common mode power is indicative of degradation in the bearing insulation and/or the ground brush of the bearing further includes producing one or more frequency features from the time-domain graph as a function of the phase current. Moreover, determining whether the common mode power is indicative of degradation also includes combining the one or more frequency features with the one or more time-domain features. Further, determining whether the common mode power is indicative of degradation also includes analyzing the one or more time-domain features fused with the one or more frequency features for anomalies.

Referring still to FIG. 6, as shown at (306), the method 300 further includes comparing, via the controller 202, the common mode power to a predefined power threshold. In particular embodiments, as shown at (408) of FIG. 7, the controller 202 can calculate an average of the common mode power (Avg ($P_{R\_CM}$)) over a predefined time instead of relying on or using the instantaneous common power determination.

Thus, as shown at (308) of FIG. 6, the method 300 includes determining, via the controller 202, whether the common mode power is indicative of degradation in the bearing insulation 132 and/or the ground brush 126 of the generator 118 based on the comparison of the common mode power to the predefined power threshold. More particularly, as shown at (410) of FIG. 7, the controller 202 is configured to determine whether the common mode power is indicative of degradation in the ground brush 126 (i.e., faulty) by assessing whether the average of the common mode power (Avg ($P_{R\_CM}$)) over the predefined time is greater than the predefined average threshold ($P_{R\_TH}$).

Thus, as shown at (412) of FIG. 7, if the average common mode power over the predefined time is less than the predefined average threshold, the controller 202 is configured to generate an indication of "healthy". Conversely, for step (410), if the average exceeds the average threshold, then the indication indicates that the ground brush 126 or the bearing insulation 132 is faulty.

In additional embodiments, the systems and methods of the present disclosure may also include and/or involve one or more machine learning algorithms. Accordingly, various machine learning algorithms may be employed in the systems and methods according to the present disclosure to iteratively refine the logic and/or the model-based determinations, calculations, and/or estimations as described herein, thereby increasing accuracy in the processing outcomes. As such, in certain embodiments, the machine learning algorithm(s) may receive feedback from the processor(s) 204 and train the feedback. Further, the machine learning algorithm(s) may be a trained neural network, a simple linear regression model, a random forest regression model, a support vector machine, a temporal convolutional network, or any suitable type of a supervised learning model based on the quality and quantity of the data received. More specifically, in an embodiment, the systems and methods according to the present disclosure may include an embedded reinforcement learning technique in a machine learning algorithm.

In additional embodiments, the time-domain graphs of the common mode power over the predefined time periods described herein may be generated using machine learning algorithms. Similarly, the frequency features may be extracted from the time-domain graphs using machine learning algorithms.

Accordingly, and still referring to FIG. 6, as shown at (310), the method 300 includes implementing, via the controller 202, a control action when the common mode power is indicative of degradation in the bearing insulation and/or the ground brush of the generator 118. For example, in particular embodiments, the control action may include changing an operating set point of the wind turbine 10, shutting down the wind turbine 10, generating an alarm, scheduling a repair, replacing or repairing the bearing insulation 132, replacing or repairing the ground brush 126, and/or any other suitable action.

Further aspects of the present disclosure are provided by the subject matter of the following clauses:

A method for preventing damage in a bearing of a generator of an electrical power system, the electrical power system having a power conversion assembly with a first converter coupled to a second converter, the power conversion assembly electrically coupled to the generator, the method comprising: monitoring a phase current and a phase voltage of the first converter; calculating a common mode power using the phase current and the phase voltage of the first converter; comparing the common mode power to a predefined power threshold; and determining whether the common mode power is indicative of degradation in at least one of a bearing insulation or a ground brush of the bearing based on the comparison of the common mode power to the predefined power threshold.

The method of the preceding clause, wherein calculating the common mode power using the phase current and the phase voltage of the first converter comprises: calculating a common mode voltage using the phase voltage; calculating a common mode current using the three-phase current; and calculating the common mode power as a function of the common mode voltage and the common mode current.

The method of any of the preceding clauses, further comprising calculating an average of the common mode power over a predefined time, wherein comparing the common mode power to the predefined power threshold further comprises comparing the average of the common mode power to a predefined average threshold.

The method of any of the preceding clauses, wherein determining whether the common mode power is indicative of degradation in at least one of the bearing insulation or the ground brush of the bearing further comprises: producing a time-domain graph of the common mode power for a predefined time period; producing one or more time-domain features from the time-domain graph; and analyzing the one or more time-domain features for anomalies in the time-domain graph.

The method of the preceding clause, wherein determining whether the common mode power is indicative of degradation in at least one of the bearing insulation or the ground brush of the bearing further comprises: producing one or more frequency features from the time-domain graph as a function of the phase current or the common mode current, the phase voltage or the common mode voltage, or the common mode power; combining the one or more frequency features with the one or more time-domain features; and analyzing the one or more time-domain features fused with the one or more frequency features for anomalies.

The method of any of the preceding clauses, wherein producing a time-domain graph of the common mode power for a predefined time period and producing one or more time-domain features from the time-domain graph comprises extracting the time-domain features from pulse code modulation (PCM) data using a temporal convolutional network (TCN).

The method of the preceding clause, wherein determining whether the common mode power is indicative of degradation in at least one of the bearing insulation or the ground brush of the bearing further comprises: combining the one or more time-domain features with frequency features from the phase current; analyzing the one or more time-domain features fused with the one or more frequency features; and generating one or more anomaly metrics, based on the analysis, that are indicative of degradation in at least one of the bearing insulation or the ground brush.

The method of any of the preceding clauses, wherein determining whether the common mode power is indicative of degradation in at least one of the bearing insulation or the ground brush of the bearing further comprises trending the one or more anomaly metrics over time.

The method of any of the preceding clauses, wherein the damage in the bearing is caused by electric discharge machining (EDM).

The method of any of the preceding clauses, wherein the generator comprises a doubly-fed induction generator (DFIG).

A wind turbine power system connected to a power grid, the wind turbine power system comprising: a doubly-fed induction generator (DFIG) comprising a rotor and a stator; a power conversion assembly electrically coupled to the DFIG, the power conversion assembly comprising a rotor-side converter coupled to a line-side converter; a controller configured to control the wind turbine power system, the controller configured to perform a plurality of operations, the plurality of operations comprising: monitoring a rotor phase current and rotor-side voltage of the rotor-side converter; calculating a common mode power using the rotor phase current and the rotor-side voltage; comparing the common mode power to a predefined power threshold; and determining whether the common mode power is indicative of degradation in at least one of a bearing insulation or a ground brush of the DFIG based on the comparison of the common mode power to the predefined power threshold.

The system of the preceding clause, wherein calculating the common mode power using the rotor phase current and the rotor-side voltage comprises: calculating a common mode voltage using the rotor-side voltage; calculating a common mode current using the rotor three-phase current; and calculating the common mode power as a function of the common mode voltage and the common mode current.

The system of any of the preceding clauses, further comprising calculating an average of the common mode power over a predefined time, wherein comparing the common mode power to the predefined power threshold further comprises comparing the average of the common mode power to a predefined average threshold.

The system of any of the preceding clauses, wherein determining whether the common mode power is indicative of degradation in at least one of the bearing insulation or the ground brush of the DFIG further comprises: producing a time-domain graph of the common mode power for a predefined time period; producing one or more time-domain features from the time-domain graph; and analyzing the one or more time-domain features for anomalies in the time-domain graph.

The system of any of the preceding clauses, wherein the plurality of operations further comprise: implementing a control action when the common mode power is indicative of degradation in at least one of the bearing insulation or the ground brush, and wherein the control action further comprises at least one of changing an operating set point of the electrical power system, shutting down the electrical power system, generating an alarm, scheduling a repair, or replacing at least one of the bearing insulation or the ground brush.

The system of any of the preceding clauses, wherein producing a time-domain graph of the common mode power for a predefined time period and producing one or more time-domain features from the time-domain graph comprises extracting the time-domain features from pulse code modulation (PCM) data using a temporal convolutional network (TCN).

The system of the preceding clause, wherein determining whether the common mode power is indicative of degradation in at least one of the bearing insulation or the ground brush of the bearing of the DFIG further comprises: combining the one or more time-domain features with frequency features from the rotor phase current; analyzing the one or more time-domain features fused with the one or more frequency features; and generating one or more anomaly metrics, based on the analysis, that are indicative of degradation in at least one of the bearing insulation or the ground brush.

The system of the preceding clause, wherein determining whether the common mode power is indicative of degradation in at least one of the bearing insulation or the ground brush of the bearing further comprises trending the one or more anomaly metrics over time.

A wind turbine power system connected to a power grid, the wind turbine power system comprising: a doubly-fed induction generator (DFIG) comprising a rotor and a stator; a power conversion assembly electrically coupled to the DFIG, the power conversion assembly comprising a rotor-side converter coupled to a line-side converter; a controller configured to control the wind turbine power system, the controller configured to perform a plurality of operations, the plurality of operations comprising: monitoring a phase current and phase voltage of the line-side converter; calculating a common mode power using the phase current and the phase voltage; comparing the common mode power to a predefined power threshold; and determining whether the common mode power is indicative of degradation in at least one of a bearing insulation or a ground brush of the DFIG based on the comparison of the common mode power to the predefined power threshold.

The system of the preceding clause, wherein calculating the common mode power using the phase current and the phase voltage comprises: calculating a common mode voltage using the phase voltage; calculating a common mode current using the phase current; and calculating the common mode power as a function of the common mode voltage and the common mode current.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for preventing damage in a bearing of a generator of an electrical power system by estimating power dissipated in a rotor-side common mode network of the electrical power system, the electrical power system having a power conversion assembly with a rotor-side converter coupled to a line-side converter, the power conversion assembly electrically coupled to the generator, the method comprising:
monitoring a rotor phase current and a rotor phase voltage of the rotor-side converter;
calculating a common mode power of the rotor-side common mode network using the rotor phase current and the rotor phase voltage of the rotor-side converter;
comparing the common mode power of the rotor-side common mode network to a predefined power threshold;
determining the common mode power of the rotor-side common mode network is indicative of degradation in at least one of a bearing insulation or a ground brush of the bearing when the common mode power of the rotor-side common mode network is greater than the predefined power threshold;
implementing a control action when the common mode power is indicative of degradation in at least one of the bearing insulation or the ground brush, the control action comprising at least one of changing an operating set point of the wind turbine power system, shutting down the wind turbine power system, repairing at least one of the bearing insulation or the ground brush, or replacing at least one of the bearing insulation or the ground brush.

2. The method of claim 1, wherein calculating the common mode power of the rotor-side common mode network using the rotor phase current and the rotor phase voltage of the rotor-side converter comprises:
calculating a common mode voltage using a three-phase voltage;
calculating a common mode current using a three-phase current; and
calculating the common mode power of the rotor-side common mode network as a function of the common mode voltage and the common mode current.

3. The method of claim 2, wherein determining whether the common mode power of the rotor-side common mode network is indicative of degradation in at least one of the bearing insulation or the ground brush of the bearing further comprises:
producing a time-domain graph of the common mode power for a predefined time period;
producing one or more time-domain features from the time-domain graph; and
analyzing the one or more time-domain features for anomalies in the time-domain graph.

4. The method of claim 3, wherein determining whether the common mode power of the rotor-side common mode network is indicative of degradation in at least one of the bearing insulation or the ground brush of the bearing further comprises:
producing one or more frequency features from the time-domain graph as a function of the rotor phase current or the common mode current, the rotor phase voltage or the common mode voltage, or the common mode power;
combining the one or more frequency features with the one or more time-domain features; and
analyzing the one or more time-domain features fused with the one or more frequency features for anomalies.

5. The method of claim 3, wherein producing a time-domain graph of the common mode power for a predefined time period and producing one or more time-domain features from the time-domain graph comprises extracting the time-domain features from pulse code modulation (PCM) data using a temporal convolutional network (TCN).

6. The method of claim 5, wherein determining whether the common mode power of the rotor-side common mode network is indicative of degradation in at least one of the bearing insulation or the ground brush of the bearing further comprises:
combining the one or more time-domain features with frequency features from the rotor phase current;
analyzing the one or more time-domain features fused with the one or more frequency features; and
generating one or more anomaly metrics, based on the analysis, that are indicative of degradation in at least one of the bearing insulation or the ground brush.

7. The method of claim 5, wherein determining whether the common mode power of the rotor-side common mode network is indicative of degradation in at least one of the bearing insulation or the ground brush of the bearing further comprises trending the one or more anomaly metrics over time.

8. The method of claim 1, further comprising calculating an average of the common mode power of the rotor-side common mode network over a predefined time, wherein comparing the common mode power of the rotor-side common mode network to the predefined power threshold further comprises comparing the average of the common mode power to a predefined average threshold.

9. The method of claim 1, wherein the damage in the bearing is caused by electric discharge machining (EDM).

10. The method of claim 1, wherein the generator comprises a doubly-fed induction generator (DFIG).

11. A wind turbine power system connected to a power grid, the wind turbine power system comprising:
a doubly-fed induction generator (DFIG) comprising a rotor and a stator;
a power conversion assembly electrically coupled to the DFIG, the power conversion assembly comprising a rotor-side converter coupled to a line-side converter;
a controller configured to control the wind turbine power system by estimating power dissipated in a rotor-side common mode network of the wind turbine power system, the controller configured to perform a plurality of operations, the plurality of operations comprising:
monitoring a rotor phase current and rotor-side voltage of the rotor-side converter;
calculating a common mode power of the rotor-side common mode network using the rotor phase current and the rotor-side voltage;
comparing the common mode power of the rotor-side common mode network to a predefined power threshold; and
determining whether the common mode power of the rotor-side common mode network is indicative of degradation in at least one of a bearing insulation or a ground brush of the DFIG when the common mode power of the rotor-side common mode network is greater than the predefined power threshold; and implementing a control action when the common mode power is indicative of degradation in at least one of the bearing insulation or the ground brush, the control action comprising at least one of changing an operating set point of the wind turbine power system, shutting down the wind turbine power system, repairing at least one of the bearing insulation or the ground brush, or replacing at least one of the bearing insulation or the ground brush.

12. The wind turbine power system of claim 11, wherein calculating the common mode power of the rotor-side common mode network using the rotor phase current and the rotor-side voltage comprises:

calculating a common mode voltage using the rotor-side voltage;

calculating a common mode current using a three-phase current; and calculating the common mode power of the rotor-side common mode network as a function of the common mode voltage and the common mode current.

13. The wind turbine power system of claim 11, further comprising calculating an average of the common mode power of the rotor-side common mode network over a predefined time, wherein comparing the common mode power to the predefined power threshold further comprises comparing the average of the common mode power to a predefined average threshold.

14. The wind turbine power system of claim 11, wherein determining whether the common mode power of the rotor-side common mode network is indicative of degradation in at least one of the bearing insulation or the ground brush of the DFIG further comprises:

producing a time-domain graph of the common mode power for a predefined time period;

producing one or more time-domain features from the time-domain graph; and analyzing the one or more time-domain features for anomalies in the time-domain graph.

15. The wind turbine power system of claim 14, wherein producing a time-domain graph of the common mode power for a predefined time period and producing one or more time-domain features from the time-domain graph comprises extracting the time-domain features from pulse code modulation (PCM) data using a temporal convolutional network (TCN).

16. The wind turbine power system of claim 15, wherein determining whether the common mode power of the rotor-side common mode network is indicative of degradation in at least one of the bearing insulation or the ground brush of the bearing of the DFIG further comprises:

combining the one or more time-domain features with frequency features from the rotor phase current;

analyzing the one or more time-domain features fused with the one or more frequency features; and generating one or more anomaly metrics, based on the analysis, that are indicative of degradation in at least one of the bearing insulation or the ground brush.

17. The wind turbine power system of claim 16, wherein determining whether the common mode power of the rotor-side common mode network is indicative of degradation in at least one of the bearing insulation or the ground brush of the bearing further comprises trending the one or more anomaly metrics over time.

\* \* \* \* \*